Aug. 10, 1943.  W. SHIPPEE ET AL  2,326,261
LOCK NUT
Filed Aug. 23, 1940
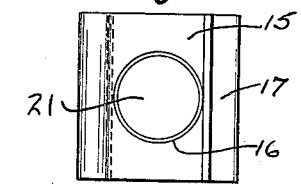
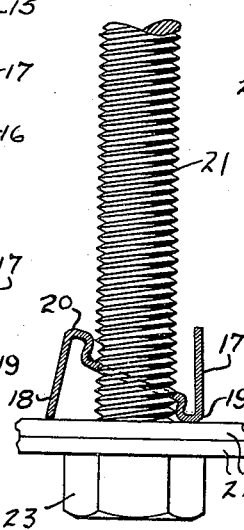
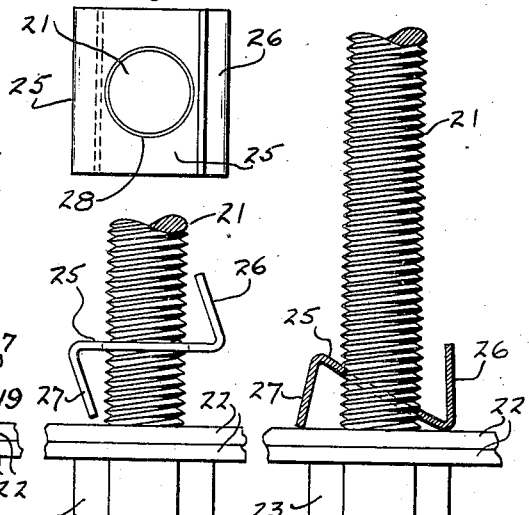
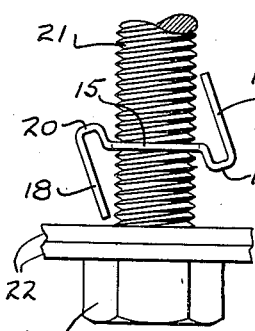
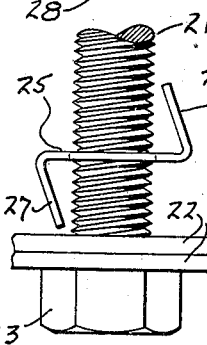
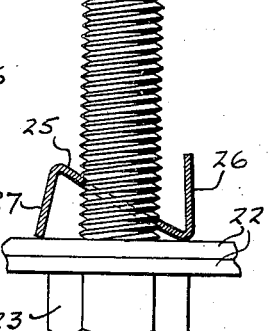
Fig. 2.  Fig. 3.  Fig. 5.  Fig. 6.
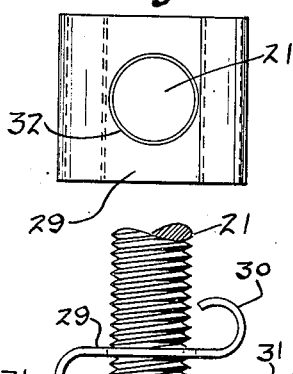
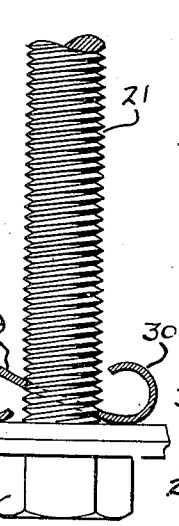
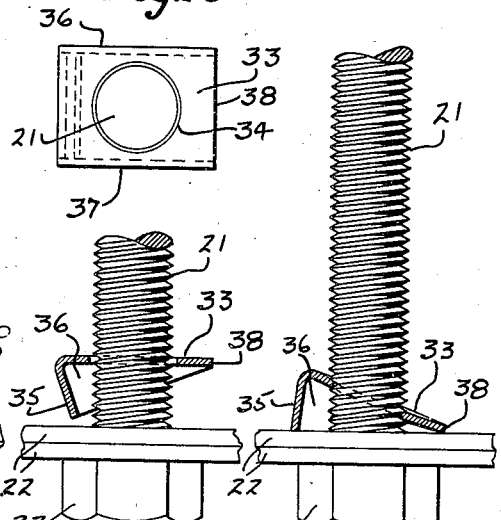
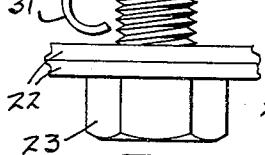
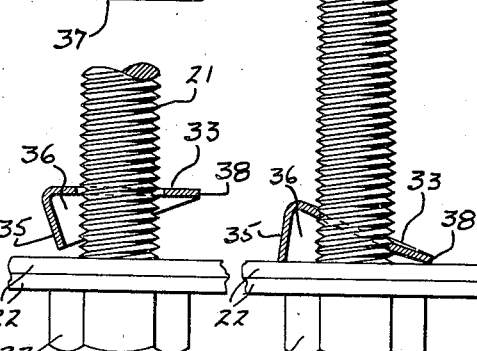
Fig. 8  Fig. 9  Fig. 11.  Fig. 12.
INVENTOR
Carl Clapp Shippee
Winsor Shippee
BY
Frederic P. Warfield
ATTORNEY Patented Aug. 10, 1943

2,326,261

UNITED STATES PATENT OFFICE 2,326,261

LOCK NUT

Winsor Shippee and Carl C. Shippee, Red Bank, N. J.

Application August 23, 1940, Serial No. 353,948

3 Claims. (Cl. 151—20)

This invention relates to lock nuts and has for its principal object to provide a lock nut which is inexpensive to make, easily applied to a bolt, and is effective in securely holding in place under conditions of severe vibration.

Another object of the invention is to provide a lock nut which may be stamped out of sheet metal.

Still another object of the invention is to provide a lock nut which may be applied to a bolt with either side towards the head of the bolt so that it cannot be applied incorrectly.

Another object of the invention is to provide a lock nut which will slip easily over a bolt and will automatically grasp the bolt when it strikes the surface of the object to be secured, so that the bolt may be tightened, thus pulling the nut down against the object.

Other objects of the invention will in part be obvious and will in part appear hereinafter.

The invention accordingly comprises an article of manufacture possessing the features, properties and the relation of elements which will be exemplified in the article hereinafter described, and the scope of the application of which will be indicated in the claims.

For a fuller understanding of the nature and objects of the invention reference should be had to the following detailed description taken in connection with the accompanying drawing, in which:

Fig. 1 is a plan view of one embodiment of the invention shown applied to a bolt;

Fig. 2 is a side elevational view of the lock nut of Fig. 1 shown slipped over the bolt without actual engagement therewith;

Fig. 3 is a sectional side elevational view of the same lock nut shown in tight locking engagement with the bolt;

Figs. 4, 5, and 6 are similar views of another embodiment of the invention;

Figs. 7, 8, and 9 are similar views of still another embodiment of the invention; and Figs. 10, 11, and 12 are similar views of still another embodiment of the invention.

The lock nut illustrated in Figs. 1, 2, and 3 is a preferred embodiment of the invention and comprises a rectangular plate 15 having a hole 16 in the center thereof which is large enough in diameter to just clear the crest of the bolt with which the lock nut is intended to be used, so as to permit slipping the lock nut over the bolt without interfering with the threads thereof. One end 17 of the plate 15 is bent outwardly from the central portion through an angle which is slightly greater than a right angle, while the other end 18 is bent in the opposite direction at substantially the same angle with respect to the central portion of the plate, so that the two ends 17 and 18 are substantially parallel. We preferably provide reinforcing ridges 19 and 20 adjacent opposite edges of the hole 16 to prevent substantial distortion of the material when the lock nut is in use, and these ridges may be formed by the manner of bending the ends 17 and 18. Thus, the ends may be given reverse bends, the end 17, for instance, starting in one direction from the plate 15 and then doubling back upon itself to extend outwardly from the plate in the opposite direction. The same thing is true of the end 18 although this end is bent in just the opposite direction from the end 17.

The plate 15 may be made of sheet material of a thickness corresponding to the distance between two adjacent threads of the bolt upon which it is to be used, and we prefer to make it of metal which is substantially as tough as the bolt with which it is to be used. Low carbon steel has been found satisfactory for ordinary steel bolts. However, other material may be used depending on the nature of the use to which the lock nut and bolt assembly is put. The lock nut may even be made of plastic material for certain types of light work.

In order to illustrate the use of the lock nut, a bolt 21 has been shown for securing two pieces of sheet metal 22 together. The bolt is inserted through suitable openings in the sheet metal members with the head 23 of the bolt against the sheet metal, and the lock nut is then slipped over the bolt, as indicated, until it engages the outermost sheet metal member. When the end 18 of the lock nut plate strikes the outer most sheet metal member, the whole lock nut begins to tilt, and as the angle of the center portion changes, the edges of the hole 16 adjacent the ridges 19 and 20 begin to engage the threads of the bolt. The bolt is now rotated in the direction of tightening it, and because the edges of the hole 16 are in engagement with the threads, the whole plate will move towards the members to be secured, as shown in Fig. 3. The ridge 19 is also pulled down against the sheet metal member 22 together with the edge of the end 18, the latter being forced from its normal position away from the bolt shank. This not only causes a secure gripping of the threads by the edges of the hole 16, but at the same time a gripping of the sheet metal member 22 by the ridge 19 and by the edge of the end 18.

It will be noted that the lateral ridges 19 and 20 act to support the metal adjacent the hole 16 and prevent the edges of the hole from being distorted and from tearing out when they engage the threads of the bolt. We prefer, therefore, to provide these ridges in close proximity to the hole 16, as close as possible without the ridges themselves engaging the threads of the bolt.

In Figs. 4, 5, and 6, a modified form of the invention is shown in which a lock nut 25 is somewhat similar to the lock nut 15 of Figs. 1, 2, and 3, having ends 26 and 27 bent in opposite directions at an angle to the central portion and a central hole 28, but without the ridges provided in the lock nut already described. Such a lock nut may be used with lighter type work where the forces acting on the bolt are less. The bolt, however, cannot be tightened as much as with the previous embodiment, because of the fact that the metal may distort owing to a lack of support at the edges which engage the threads. Otherwise, the application of the lock nut of Figs. 4, 5, and 6 is the same as described for that shown in the previous three figures.

In Figs. 7, 8, and 9 a still further modification of the invention is shown, wherein a lock nut 29 is formed of a plate with the ends 30 and 31 curved about a radius instead of being bent at a relatively sharp angle. A center hole 32 is provided to receive the bolt. This arrangement also is applicable to light work, since there is a tendency for the material of the lock nut to distort adjacent the hole 32 when the bolt is forcibly tightened.

The modifications shown in all of the preceding figures have the desirable feature in common that they are reversible, so that either side may be positioned towards the head of the bolt. This makes it possible for an operator assembling devices using the particular lock nut of the invention to select a nut blindly and place it over the bolt without paying any attention to which side faces the head of the bolt, as long as the bolt slips into the hole of the lock nut. In other words, there is no right and wrong side which necessitates careful positioning on the bolt, and this makes for increased speed in assembling operations.

In Figs. 10, 11, and 12 we have shown another modification of the lock nut in which there is a right and wrong side and the lock nut has to be placed on the bolt in one way to make it operate properly. The lock nut 33 of Figs. 10, 11, and 12 is a plate of sheet material with a hole 34 in the center thereof and one end 35 bent at an angle with respect to the plate. Triangular side portions 36 and 37 of the plate are bent in the same direction as the end 35 forming substantially right angles to the central part of the plate and are so shaped as to align with the outer edge of the end 35 and taper towards the other edge 38 as clearly indicated in Fig. 11. The sides 36 and 37 are preferably arranged close to the edges of the hole 34, as indicated in Fig. 10, so as to support the metal at the edges of the hole in much the same manner that the ridges 19 and 20 do in the embodiment of Figs. 1, 2, and 3, although in this case the support comes at the sides of the hole 34 which do not engage the threads.

In the use of this embodiment of the invention the lock nut 33 must be placed over the bolt with the sides 36 and 37 towards the head of the bolt. When the central plate of the lock nut is at right angles to the axis of the bolt it may slide over the bolt without engaging the threads thereof, but when the edge of the end 35 strikes the sheet metal member which is intended to be held by the bolt, the angle of the lock nut is changed and the edges of the hole adjacent the ends of the lock nut engage the threads of the bolt similarly to the embodiments already described. Upon tightening the bolt the lock nut is then brought down tightly against the member to be secured with the edge of the end 35 engaging the member as well as the edges of the sides 36 and 37 and the corner of the end 38. Thus, the lock nut is prevented from turning and holds the parts securely together.

The lock nuts of all of the embodiments described above are not intended to be used a second time, since the first use will tend to distort portions of the lock nut especially where the edges of the hole engage in the threads, so that if the lock nut is removed and then applied the second time it will not hold as securely. The bent-over ends in each case are at such an angle and of such a length that they will avoid contact with the shank of the bolt when the lock nut is slipped over the bolt, as is shown in Figs. 2, 5, 8, and 9. This is important since it is desired to provide as easy an application of the lock nut as possible.

The lock nut of the invention is especially intended to be used alone on a bolt without any other device to help hold it in position. However it may also be used in conjunction with an ordinary nut, being placed on the bolt after the ordinary nut has been screwed into place and tightened down against it. Used in this way it will secure the ordinary nut against turning on the bolt.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described our invention, what we claim as new and desire to secure by Letters Patent is:

1. A lock nut for a threaded bolt comprising a substantially flat plate of sheet material having a thickness substantially equal to the distance between two threads on said bolt, and having a hole therethrough with a diameter slightly larger than the crest diameter of the said bolt, one end of said plate being bent in one direction and the other end of said plate being bent in the other direction, and ridges in the material of said plate adjacent said hole so as to prevent substantial distortion of said material when said lock nut is used.

2. A lock nut for a threaded bolt comprising a plat having a hole therein slightly larger in diameter than the diameter of the bolt, one end of said plate having a reverse bend therein adjacent said hole, the material extending outwardly from said plate in one direction and doubling back upon itself and then extending in the other direction for a predetermined distance from said plate, the other end of said plate also having a reverse bend therein but in the opposite direction, the material extending outwardly from said plate in the opposite direction from said first end and then doubling back on itself and extending in the other direction for a predetermined distance, whereby reinforcing ridges are formed at opposite edges of said hole to prevent the material of said plate from distorting when said lock nut is in use.

3. A lock nut for a threaded bolt comprising a plate of sheet material having a thickness substantially equal to the distance between two adjacent threads on said bolt and having a hole in the center thereof with a diameter slightly larger than the crest diameter of the said bolt, said plate having opposite ends thereof curved outwardly in opposite directions away from said plate, whereby when said lock nut is slipped over a bolt one of said curved ends will engage the object to be secured and alter the angle of said plate so as to cause the edges of said hole to engage the threads of said bolt.

WINSOR SHIPPEE.
CARL C. SHIPPEE.